April 4, 1967   R. J. WALDO ETAL   3,312,500
MOLDING
Filed Aug. 2, 1965
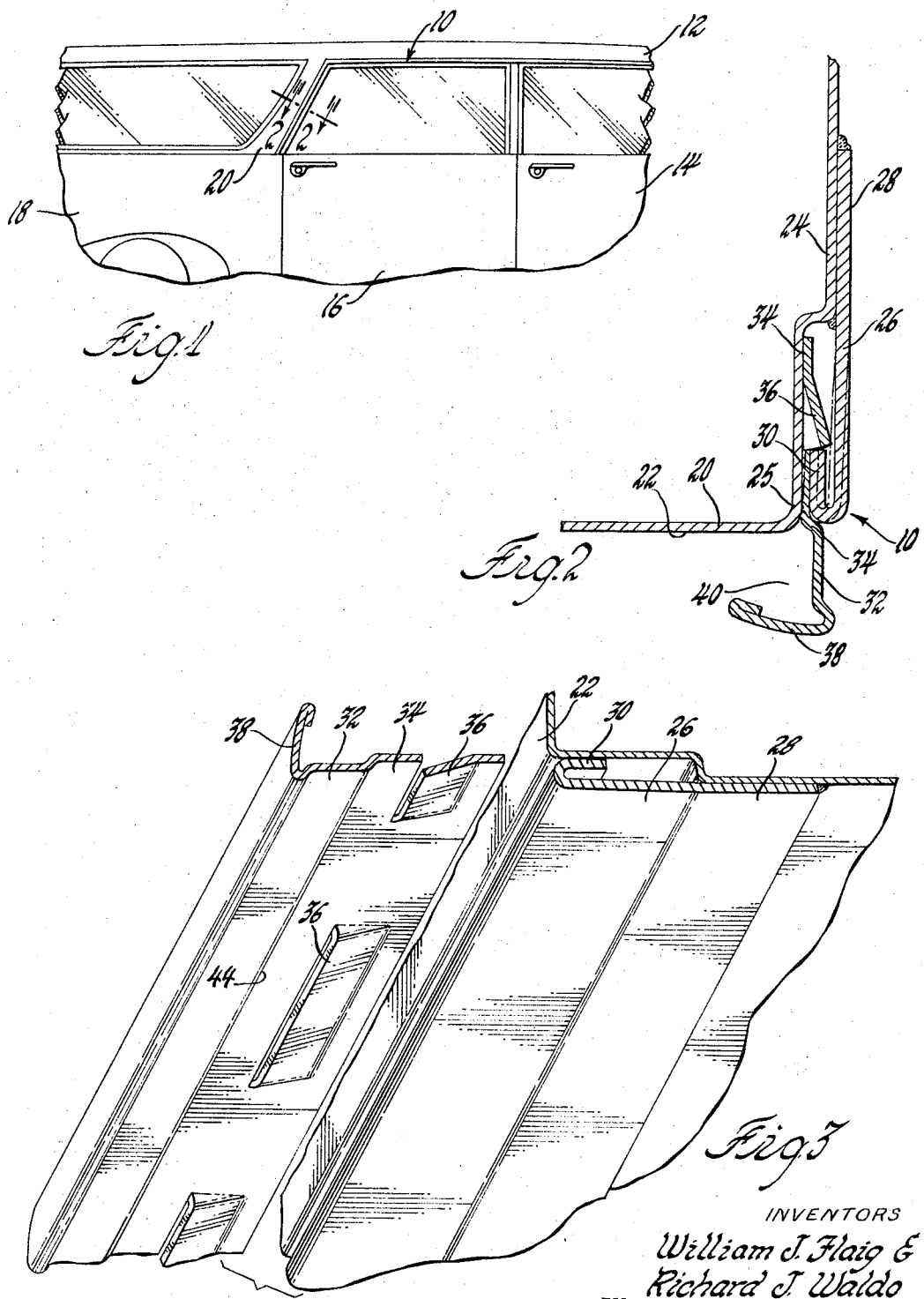
INVENTORS
William J. Flaig &
Richard J. Waldo
BY
Paul Fitzpatrick
ATTORNEY

United States Patent Office 3,312,500
Patented Apr. 4, 1967

3,312,500
MOLDING
Richard J. Waldo, Mount Clemens, and William J. Flaig, Detroit, Mich., assignors to General Motors Corporation, Detroit, Mich., a corporation of Delaware
Filed Aug. 2, 1965, Ser. No. 476,351
4 Claims. (Cl. 296—135)

This invention relates generally to motor vehicles, and it has particular relation to a drip molding applicable for preventing the drainage of water from the vehicle roof downwardly over the sides of the vehicle.

The use of a drip molding along the sides of a vehicle above the doors and windows is known generally, and ordinarily the molding forms a gutter which drains the water to one or both ends of the vehicle. Generally, this gutter is fastened to the vehicle body by welding. In addition, screws are sometimes used for this purpose. This use of screws to secure the drip molding to the body results in a rather complicated and time-consuming assembly procedure.

It is, therefore, an object of this invention to provide a drip molding assembly which eliminates the assembly problems associated with the generally used securement methods. Other objects, features, and advantages of the subject invention will become clear upon reference to the following detailed description and the drawings showing the preferred embodiment thereof, wherein:

FIGURE 1 is a schematic view of a vehicle utilizing the invention;

FIGURE 2 is a sectional view of the molding assembly as taken in the direction of arrows 2—2 in FIGURE 1; and FIGURE 3 is a perspective view of the component parts of the molding assembly.

In general, the invention resides in a drip molding assembly 10 as it is used upon a vehicle 12. The vehicle 12 shown in FIGURE 1 is a station wagon. However, it should be clear that such a molding assembly has application on almost any type of vehicle wherein it is desired to divert the flow of water from the roof of the vehicle away from certain areas. In the FIGURE 1 embodiment, the molding assembly 12 diverts the water away from the door openings 14 and 16 of the vehicle and deposits it upon a rear fender 18. Hence, the molding assembly 10 extends along the roof line at the upper extremities of the doors 14 and 16 and then extends down the pillar 20 to carry the water to the rear fender 18. It should be clear that such a molding assembly 10 could extend the full length of the roof line or could be used in any such manner as desired. In this embodiment it is used to restrict any water on the roof from running into the vehicle when the doors are open.

The molding assembly 10 as it appears in conjunction with the pillar 20 is shown in detail in FIGURE 2. The locking pillar 20 has an outer face 22 which is visible on the exterior of the vehicle. Connected to this outer face 22 and at substantially right angles therewith is an inner face 24 which provides a portion of the frame for the door opening. A substantially J-shaped molding fastener 26 has a long leg 28 and a recurved short leg 30 which is bent from one end of the leg 28 so that it is substantially parallel to the leg 28. The leg 28 is welded to the inner face 24 and at the interior extremity of the leg 28. This then positions the short leg 30 of the J-shaped fastener 26 parallel to and adjacent to the outer extremity 25 of the inner face 24. The drip molding itself consists of a substantially L-shaped member 32. The longest side 34 of the L-shaped molding 32 has a plurality of tab portions 36 which are lanched therefrom at various locations along the length of the molding 32. These lanced tab portions 36 are located adjacent to the outer end of side 34. The short side 38 of the L-shaped molding 32 is then at substantially right angles to the long side 34. To assemble, the long side 34 of the molding 32 is positioned between the short leg 30 of the J-shaped fastener 26 and the other extremity 25 of the inner face 24. Since the J-shaped fastener 26 is not secured to the inner face 24 at this end, it is free to be bent slightly away from the inner face 24, thereby allowing the long side 34 of the molding 32, including the lanced tabs 36, to pass therebetween. Once the lanced tabs 36 have passed beyond the end of the leg 30 of the J-shaped fastener 26 they snap behind this leg 30 to thereby secure the molding 32 in place. A channel 40 is thereby formed between the short side 38 of the drip molding 32 and the outer panel 22 of the pillar. This channel 40 provides the flow path for the water from the vehicle roof to flow along the channel 20 and be deposited at a point to the rear of the door opening 16. It should be noted that the size of the channel 40 can be selected by varying the length of the long side 34 of the molding 32 or by varying the size and location of the lanced tabs 36.

It will be noted that the long side 34 of the molding is formed with an offset which provides a shoulder 44 which shoulder bears against the return bend of the molding fastener 26 as shown in FIGURE 2 to limit inward movement of the molding 32.

Thus, the subject invention provides a drip molding assembly which effectively diverts water away from critical areas on a vehicle and which is relatively simple in construction and easy to assemble.

Although but one embodiment of the subject invention has been shown and described in detail, many changes and modifications can be made thereto without departing from the scope of the invention.

We claim:
1. A drip molding assembly adapted to be secured to a panel having two faces substantially at right angles to each other, said assembly comprising: a generally J-section fastener having a long leg and a short leg recurved from one end of said long leg, said long leg being secured to one face of said panel at a location such that the junction between said long and short legs is located near the junction of the faces of said panel, said fastener being oriented so that said short leg resides between said panel and said long leg, and a generally L-section molding having a long side with a plurality of tabs lanced therefrom and a short side at roughly right angles to said long side, said long side being inserted between said one face of said panel and said fastener so that said tabs are locked behind said short leg of said fastener to secure said molding relative to the other face of said panel to form a channel between said short side of said molding and said other face of said panel.

2. A drip molding assembly as set forth in claim 1 wherein said channel provides a flow path for a liquid.

3. A drip molding assembly as set forth in claim 1 wherein the size of said channel can be selected by varying the length of said long side of said molding.

4. A drip molding assembly as set forth in claim 1 wherein the size of said channel can be selected by varying the size and location of said lanced tabs.

References Cited by the Examiner
UNITED STATES PATENTS

| | | | |
|---|---|---|---|
| 2,039,208 | 4/1936 | Billman | 296—135 X |
| 2,319,723 | 5/1943 | Crowe et al. | 296—135 X |
| 2,544,580 | 3/1951 | Blanchet | 296—135 |

BENJAMIN HERSH, Primary Examiner.

C. C. PARSONS, Assistant Examiner.